United States Patent [19]

Dick

[11] Patent Number: 5,078,216

[45] Date of Patent: Jan. 7, 1992

[54] COMBINATION TILLAGE APPARATUS

[76] Inventor: Virgil Dick, P. O. Box 1766, Sedalia, Mo. 65302

[21] Appl. No.: 633,129

[22] Filed: Dec. 24, 1990

[51] Int. Cl.$^5$ .......................... A01B 33/02; A01B 5/08; A01B 63/24
[52] U.S. Cl. .................................... 172/117; 172/124; 172/582; 172/583; 172/584
[58] Field of Search ...................... 172/149, 35, 48, 50, 172/51, 55, 57, 60, 63, 68, 71, 76, 78, 124, 98, 99, 117, 133, 151, 169, 184, 386, 395, 603, 579, 582, 583, 584, 654, 655, 656, 586, 587

[56] References Cited

U.S. PATENT DOCUMENTS

| | | | |
|---|---|---|---|
| 114,707 | 5/1871 | Pond | 172/584 |
| 204,793 | 6/1878 | Bramer | 172/584 |
| 796,942 | 8/1905 | Stafford & Baxter | 172/603 |
| 1,059,141 | 4/1913 | Gerhard | 172/184 |
| 1,733,153 | 10/1929 | Hagglund . | |
| 1,858,749 | 5/1932 | Paterson et al. . | |
| 2,508,872 | 3/1951 | Price | 172/582 |
| 2,569,464 | 10/1952 | Edwards et al. | 172/149 |
| 2,596,579 | 5/1952 | McKay | 172/584 |
| 2,601,640 | 6/1952 | Simmons | 172/584 |
| 2,935,139 | 5/1960 | Dede . | |
| 3,080,004 | 3/1963 | McNair | 172/587 |
| 3,133,598 | 5/1964 | Caldwell . | |
| 3,191,691 | 6/1965 | Newkirk | 172/584 |
| 3,195,249 | 7/1965 | Collins | 172/655 |
| 3,202,221 | 8/1965 | Monk et al. . | |
| 3,263,756 | 8/1966 | Hines | 172/60 |
| 3,398,707 | 8/1968 | McClenny . | |
| 3,437,061 | 4/1969 | Wells . | |
| 3,931,859 | 1/1976 | Van Der Lely . | |
| 3,943,999 | 3/1976 | Van Der Lely et al. . | |
| 3,944,000 | 3/1976 | Van Der Lely et al. . | |
| 3,949,813 | 4/1976 | Van Der Lely . | |
| 4,010,900 | 3/1977 | Flix et al. | 172/656 |
| 4,051,902 | 10/1977 | Van der Lely . | |
| 4,051,903 | 10/1977 | Van Der Lely . | |
| 4,051,904 | 10/1977 | Van Der Lely . | |
| 4,055,126 | 10/1977 | Brown et al. . | |
| 4,095,652 | 6/1978 | Van Der Lely . | |
| 4,095,653 | 6/1978 | Van Der Lely . | |
| 4,102,406 | 7/1978 | Orthman . | |
| 4,114,695 | 9/1978 | Van Der Lely . | |
| 4,114,696 | 9/1978 | Van Der Lely . | |
| 4,136,741 | 1/1979 | Rambach . | |
| 4,136,742 | 1/1979 | Van Der Lely . | |
| 4,142,589 | 3/1979 | Schlagenhauf . | |
| 4,148,363 | 4/1979 | Van Der Lely . | |
| 4,202,415 | 5/1980 | Barlage . | |
| 4,210,209 | 7/1980 | Van Der Lely . | |
| 4,263,974 | 4/1981 | Van Der Lely . | |
| 4,268,056 | 5/1981 | Miyata et al. . | |
| 4,268,057 | 5/1981 | Engelmann et al. . | |
| 4,279,310 | 7/1981 | Van Der Lely . | |
| 4,279,311 | 7/1981 | Dietrich, Sr. . | |
| 4,284,146 | 8/1981 | Van Der Lely . | |
| 4,285,284 | 8/1981 | Van Der Lely . | |
| 4,337,833 | 7/1982 | Welch . | |
| 4,337,834 | 7/1982 | Weichel . | |
| 4,339,003 | 7/1982 | Van Der Lely . | |
| 4,339,004 | 7/1982 | Van Der Lely et al. . | |
| 4,359,100 | 11/1982 | Weichel . | |
| 4,386,661 | 6/1983 | McCause et al. . | |
| 4,450,915 | 5/1984 | De Haai | 172/55 |
| 4,509,603 | 4/1985 | Adams | 172/656 |
| 4,512,414 | 4/1985 | Kuhn et al. . | |
| 4,544,038 | 10/1985 | Schomert . | |
| 4,928,774 | 5/1990 | Bell | 172/603 |

FOREIGN PATENT DOCUMENTS 278688 11/1964 Netherlands ........................ 172/330

Primary Examiner—Dennis L. Taylor
Assistant Examiner—Spencer Warnick
Attorney, Agent, or Firm—Litman, McMahon & Brown

[57] ABSTRACT

A combination tillage apparatus for towing behind a tractor comprises an extended frame having a trunk member oriented along the direction of travel of the apparatus and at least one pair of parallel and spaced apart branch members oriented perpendicularly to the trunk member. Each one of a pluralilty of implements is mounted in a mounting mechanism and a stabilizing mechanism which provide independent angular, translational, and vertical adjustment of each of the implements relative to the frame. A first modified embodiment of the combination tillage apparatus allows angular adjustment of the implement relative to the stabilizing mechanism independently from the angular adjustment of the stabilizing mechanism relative to the frame. A second modified embodiment of the combination tillage apparatus comprises a compact frame for towing behind a garden tractor, a yoke in combination with a wheel and a strut for providing either fixed angular orientation of the implement relative to the frame or fixed angular orientation of the implement relative to the direction of travel of the apparatus, and a motor and a shaft for driving a hydraulically powered implement.

A third modified embodiment of the combination tillage apparatus provides mounting mechanisms of each of the other embodiments mounted on a plurality of the compact frames connected in tandem.

9 Claims, 3 Drawing Sheets

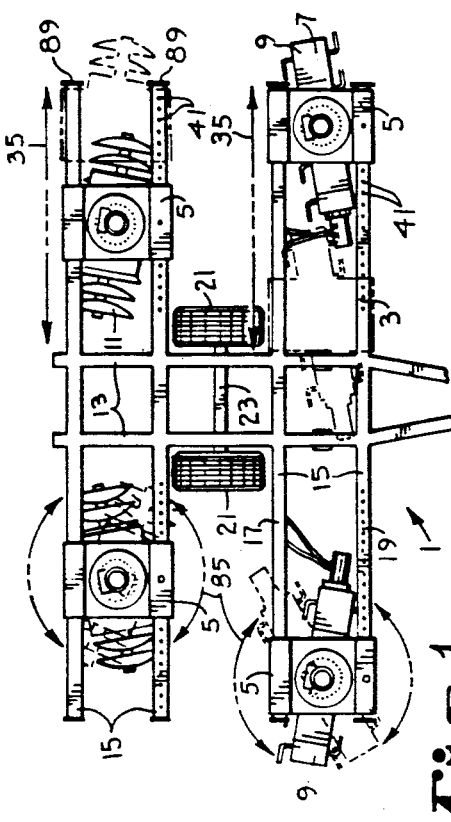

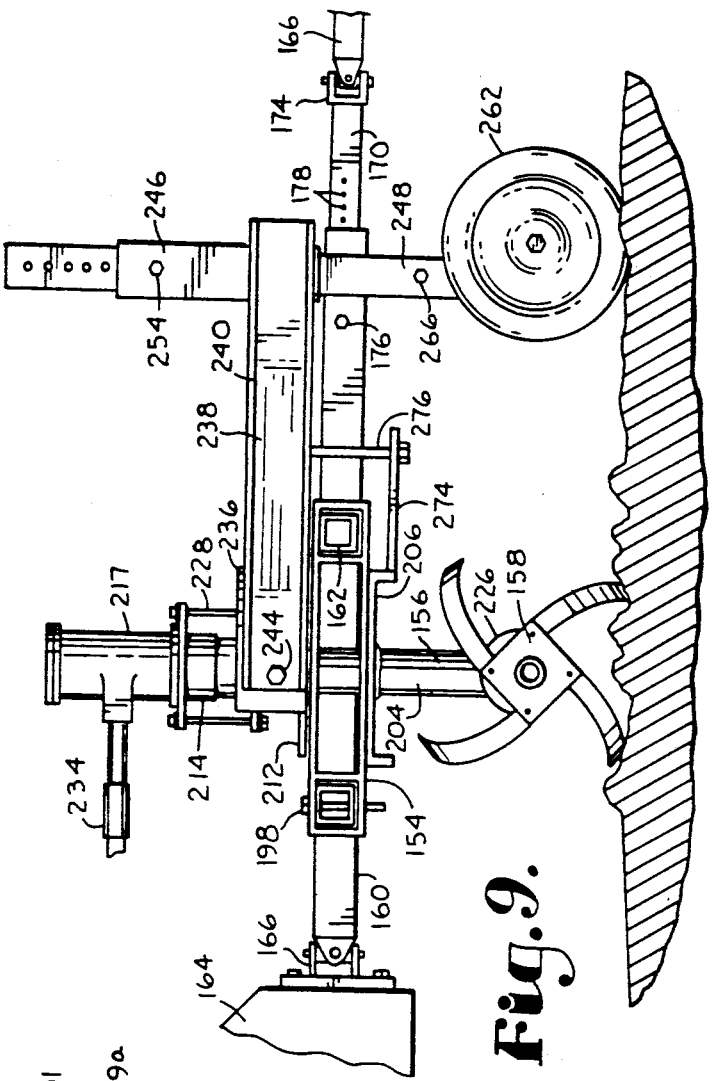

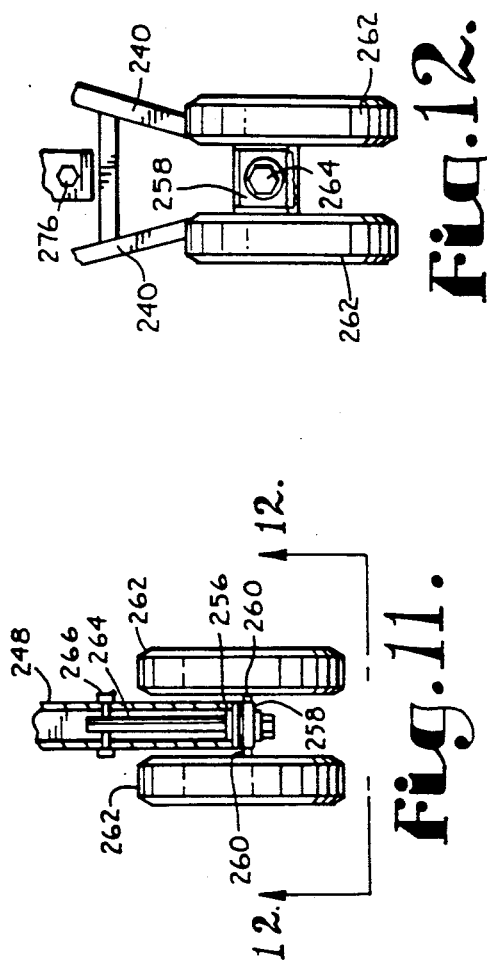
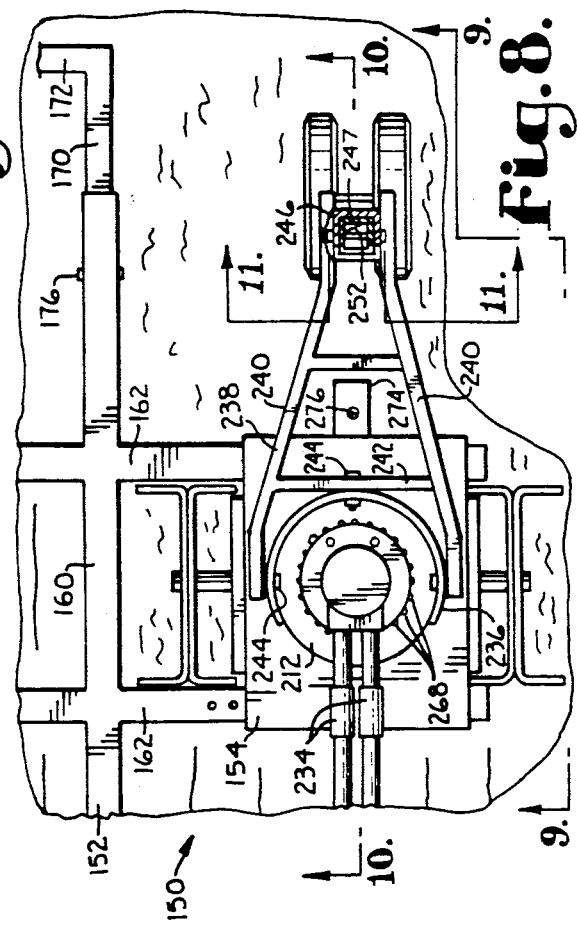
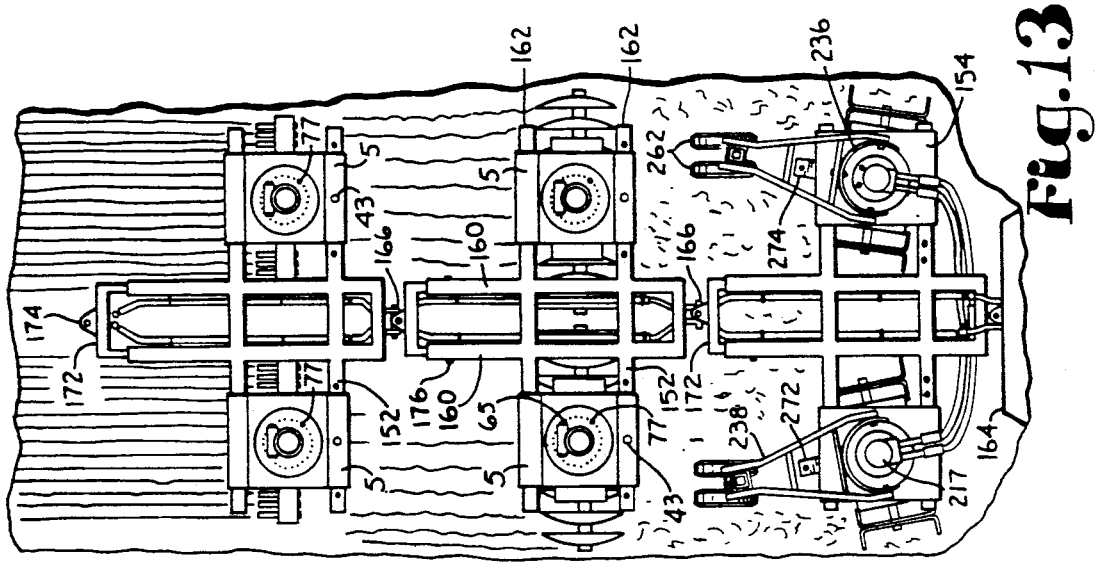

COMBINATION TILLAGE APPARATUS

BACKGROUND OF THE INVENTION

The present invention relates to farming implements, and, in particular, to implements adapted for towing behind a tractor for performing a variety of different tilling applications.

Numerous tillage apparatuses have been developed for performing a multitude of soil tilling operations for agricultural and other purposes. Generally, each of said apparatuses is designed to perform one particular type of operation. Such operations may include simple working of the soil in preparation for seed planting or the like, cultivation, windrowing, etc.

If a different tilling operation is desired, then an entirely different tillage apparatus must be used. Acquisition of a totally different apparatus for each tilling operation represents a substantial investment in equipment, particularly when some of the apparatuses are completely idled while others are being used.

What is needed is a variety of tilling devices or implements for interchangeable mounting on a frame structure, which is adapted to be towed behind a tractor. Such a frame structure should be adapted to receive one or more types of mounting mechanisms depending on the requirements of a particular implement or tilling operation. For instance, windrowing of soil along a row of growing plants may require a ridge of soil having a desired width and height. To construct such a ridge, soil needs to be moved transversely to the general direction of travel of the implement, such as a disk. The width or height of such a ridge could generally be more readily attained if each such disk implement on each side of the row of plants were independently angularly and laterally adjustable.

Another desirable feature for such a combination apparatus is the ability to employ either non-powered implements or hydraulically powered implements simultaneously in the same apparatus. Also, for some applications, it may be desirable to fix the angular orientation of an implement relative to the frame, and, for other applications, it may be desirable to fix the angular orientation of an implement relative to the direction of travel of the apparatus.

A further desirable feature would be for such a combination apparatus to have more than one frame structure, each of which is compatible with the various mounting mechanisms, wherein one of such frame structures is sufficiently compact such that a limited number of implements can be mounted thereon and can be safely towed behind a garden tractor, and another of such frame structures is sufficiently extended such that a greater number of implements can be mounted thereon to more effectively utilize the greater power and productivity available when towed behind a farm tractor.

SUMMARY OF THE INVENTION

An improved combination tillage apparatus is provided for towing behind a tractor. The apparatus includes a frame having at least one trunk member oriented along the direction of travel of the apparatus when towed behind the tractor and at least one pair of parallel and spaced apart branch members extending horizontally from and perpendicularly to the trunk member.

A mounting mechanism has a pair of parallel frame sleeves interconnected by a platform. The frame sleeves are spaced apart by the platform such that the frame sleeves are slidably telescopable over the pair of branch members. A frame pin through a pinhole in one of the frame sleeves and a selected one of a plurality of cooperating throughbores of one of the pair of branch members rigidly and adjustably secures the lateral displacement of the mounting mechanism relative to the frame.

Each of a variety of implements for providing different tilling operations is rigidly secured to a post. A bearing plate is perpendicularly and rigidly secured to an implement sleeve. The implement sleeve operably extends substantially vertically through a centrally spaced aperture in the platform. The post operably extends through the implement sleeve. A pin in conjunction with a throughbore in the implement sleeve and a plurality of cooperative throughbores in the post provides selective adjustment of the elevational spacing of the implement relative to the frame.

A stabilizing mechanism, comprising a cylindrically shaped post sleeve having a stabilizing plate rigidly secured to one end thereof, is telescoped over the upwardly extending distal end of the implement post. A securement mechanism, comprising a key, keyway and post notch, operably secures the relative spacing of the mounting mechanism, the implement and the stabilizing mechanism such that both the stabilizing plate of the stabilizing mechanism and the bearing plate of the implement substantially operably abut the platform of the mounting mechanism.

An angular adjustment pin through a bore in the platform and a selected one of a plurality of cooperating throughbores of the stabilizing plate rigidly and adjustably secures the angular adjustment of the implement relative to the frame.

The frame is sufficiently extended that a plurality of the implements can be mounted on one of the frames as hereinbefore described.

A first modified embodiment of the present invention provides a securement mechanism comprising a pin through a diametric bore of a post sleeve and a selected one of a plurality of cooperating diametric throughbores of an implement post such that the relative angular displacement between the implement post and the post sleeve is adjustable separately from the relative angular displacement between a stabilizing plate and a platform.

A second modified embodiment of the present invention provides a compact frame for towing behind a garden tractor, a yoke in combination with a wheel and a strut, and a motor and a shaft for driving a hydraulically powered implement. One end of the yoke is rigidly secured to a shroud which, in turn, is rigidly secured to a stabilizing plate.

The strut is vertically adjustable relative to the yoke. The yoke and the wheel can be used either in a first configuration such that the angular orientation of an implement is fixed relative to the frame or in a second configuration such that the angular orientation of the implement is fixed relative to the direction of travel of the apparatus.

A third modified embodiment of the present invention provides mounting of implements on a plurality of the frames of the second modified embodiment, connected in tandem, by using the mechanisms hereinbefore described of the other embodiments.

OBJECTS OF THE INVENTION

Therefore, the objects of the present invention are: to provide an apparatus comprising a frame having a mounting mechanism for mounting an interchangeable implement on the frame wherein the mounting mechanism provides both angular and translational adjustment of the mounted implement relative to the frame; to provide such an apparatus which is adaptable for use with either mechanically or hydraulically activated implements; to provide such an apparatus which is adaptable for use with a variety of different types of tilling implements; to provide such an apparatus which is adaptable for simultaneously using more than one type of tilling implement; to provide such an apparatus which is gangable such that a multiplicity of tilling operations can be conducted with a single pass; to provide such an apparatus such that each of the implements is independently angularly, translationally, and vertically adjustable; to provide such an apparatus which selectively and independently provides angular orientation of each of the implements relative to either the frame or the direction of travel; to provide such an apparatus which is readily controllable and repairable because it is constructed using relatively few parts; to provide such an apparatus which includes a frame which may be economically manufactured by welding together lengths of readily available tubular elements; and to provide such an apparatus which is rugged and durable, efficient in operation, simple to maintain, easy to operate, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, top plan view of an extended frame and a fixed support structure of a combination tillage apparatus according to the present invention with two hydraulically powered tillage implements and two non-powered tillage implements shown mounted thereon and illustrating alternative mounting positions in phantom lines.

FIG. 2 is an enlarged and fragmentary top plan view of a mounting mechanism and a stabilizing mechanism of the combination tillage apparatus.

FIG. 3 is an enlarged and fragmentary cross-sectional view of the mounting and stabilizing mechanisms of the combination tillage apparatus, taken along line 3—3 of FIG. 2.

FIG. 4 is an enlarged and fragmentary cross-sectional view of the mounting mechanism of the combination tillage apparatus, taken along line 4—4 of FIG. 3.

FIG. 5 is a further enlarged and fragmentary side elevational view of the mounting and stabilizing mechanisms of the combination tillage apparatus, with portions cut away to show details thereof.

FIG. 6 is a fragmentary top plan view of a mounting mechanism and a stabilizing mechanism of a first modified embodiment of a combination tillage apparatus, according to the present invention.

FIG. 7 is a fragmentary cross-sectional view of the mounting and stabilizing mechanisms of the first modified embodiment of the combination tillage apparatus, taken along line 7—7 of FIG. 6.

FIG. 8 is a fragmentary top plan view of a compact frame and a variable support device of a second modified embodiment of a combination tillage apparatus showing a hydraulically powered tillage implement mounted thereon, according to the present invention.

FIG. 9 is a cross-sectional view of a mounting mechanism and a stabilizing mechanism of the second modified embodiment of the combination tillage apparatus, taken along line 9—9 of FIG. 8.

FIG. 10 is an enlarged and fragmentary cross-sectional view of the mounting and stabilizing mechanisms of the second modified embodiment of the combination tillage apparatus, taken along line 10—10 of FIG. 8.

FIG. 11 is a fragmentary cross-sectional view of the variable support device of the second modified embodiment of the combination tillage apparatus, taken along line 11—11 of FIG. 8.

FIG. 12 is a fragmentary cross-sectional view of the variable support device of the second modified embodiment of the combination tillage apparatus, taken along line 12—12 of FIG. 11.

FIG. 13 is a top plan view of a third modified embodiment of the tillage apparatus of the invention having three of the compact frames of the second modified embodiment of the combination tillage apparatus connected in tandem, showing two of the second modified embodiment variable support devices, with a pair of hydraulically powered tillage implements mounted on the first such compact frame and two pair of the first embodiment mounting and stabilizing mechanisms with non-powered tillage implements mounted on the next two such frames respectively.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

It is to be understood that the various frames, mounting means, support means, tilling implements, etc., of the present invention can be used interchangeably in various combinations. The following discussion portrays the various aspects as different embodiments, not to limit the applicability thereof, but to emphasize the versatility and adaptability of the various available components of the present invention. The materials used for the various parts of the apparatus have sufficient ruggedness and durability to withstand the abusive treatment usually incurred in a normal tilling application.

The reference numeral 1 generally refers to a combination tillage apparatus in accordance with the present invention, as shown in FIGS. 1-5. The combination tillage apparatus 1 comprises frame means, such as illustrated extended frame 3, mounting means, such as illustrated mounting mechanism 5, and at least one interchangeable implement 7, such as a tiller 9 or a disk 11, as is shown in FIG. 1.

The extended frame 3 generally comprises a pair of elongate trunk members, such as trunk members 13, and one or more pairs of branch members, such as branch members 15, as are shown in FIG. 1. The trunk members 13 are generally operably oriented substantially horizontally and along the direction of travel of the tillage apparatus 1 when pulled by a conventional-type self-propelled farm tractor (not shown) to which the frame 3 is adapted to be selectively secured.

Similarly, the pairs of branch members 15 are oriented substantially horizontally, aligned substantially perpendicularly to the direction of travel of the apparatus 1, and are rigidly secured to the trunk members 13, such as by welding or other suitable means, with the pair of branch members 15 generally extending equidistantly outwardly from the trunk members 13, as is shown in FIG. 1. Each pair of branch members 13, such as branch members 17 and 19, are parallel and spaced apart (preferably with equal spacing for each pair) in order to cooperate with each of the mounting mechanisms 5 mounted thereon, as hereinafter described. In addition, the length of the branch members 13 is such that, depending on the type of the implements 7 installed on the support frame 3, more than one of the implements 7 can be installed on each side of the trunk members 13.

The extended frame 3 is supported by support means, such as the illustrated pair of wheels 21 rotatably secured to an axle 23. The axle 23 is, in turn, generally rigidly secured to and spaced below the trunk members 13 such that the extended frame 3 is generally operably maintained substantially horizontally when connected to and towed behind a tractor.

The mounting mechanism 5 comprises a frame platform 29 which is substantially planar and is rigidly secured to and interconnects a pair of frame sleeves 31 spaced at opposing sides of the platform 29, as is shown in FIG. 3. The frame platform 29 is secured to the frame sleeves 31 such that lower surfaces of the frame platform 29 and the frame sleeves 31 are coplanar, as is shown in FIG. 3. Alternatively, the frame platform 29 can be secured to the frame sleeves 31 such that the upper surfaces of the frame platform 29 and the frame sleeves 31 are coplanar (not shown), or the frame platform 29 can include two plates (not shown), an upper plate and a lower plate, such that the upper surfaces of such upper plate and the frame sleeves 31 are coplanar and the lower surfaces of such lower plate and the frame sleeves 31 are coplanar, as described for a subsequent embodiment herein.

Each of the frame sleeves 31 has an axial opening 33 therethrough having dimensions greater than corresponding outside dimensions of the branch members 15, as is shown in FIG. 3, such that the mounting mechanism 5 can be slidably positioned along the branch members 15, as is indicated by the arrows referenced by the numeral 35 in FIG. 1.

The difference between the outside dimensions of the branch members 15 and the dimensions of the frame sleeve openings 33 is kept to a minimum in order to minimize the "play" therebetween such that the spacing of the implement 7 secured to the mounting mechanism 5 relative to the support frame 3 can be reliably maintained and to reduce the effects of wearing between the contacting surfaces of the branch members 15 and the frame sleeves 31.

At least one of the frame sleeves 31, such as frame sleeve 37, has a substantially vertically oriented pinhole or bore 39 therethrough. Similarly, the branch member 19, inserted through the opening 33 in the frame sleeve 37, has a plurality of bores 41 which are spaced for cooperative alignment with the frame sleeve bore 39. A frame pin 43, having a head 45 and a shaft 47, is dimensioned such that the head 45 is substantially larger than the frame sleeve bore 39 and the diameter of the shaft 47 is smaller than the diameter of the bores 39 and 41 such that the shaft 47 is easily slidable through the bores 39 and 41 when the bore 39 is aligned with a selected one of the bores 41.

It is intended that the removal of a single pin, namely the frame pin 43, will permit repositioning of the mounting mechanism 5 along the pair of branch members 15, as indicated by the arrow 35, and the reinsertion of a single pin, namely the frame pin 43, through the bore 39 and a selected one of the bores 41 will establish a new fixed spacing of the mounting mechanism 5 relative to the pair of branch members 15.

The implement 7 includes attachment means, such as a post 49, a lower or bearing plate 51, and a bearing plate sleeve or implement sleeve 52. Each of the implements 7, such as the disk 11 as is shown in FIG. 3, has one of the posts 49 rigidly secured thereto such that the post 49 is oriented substantially vertically when the implement 7 is in use.

The implement sleeve 52 is generally cylindrically shaped and is dimensioned to be slidably insertable through a bore or aperture 53 centrally located in the frame platform 29. The bearing plate 51, which is shown rectangularly shaped in FIG. 2, but which may be circular or any other desired shape, is rigidly secured perpendicularly to the lower extremity of the implement sleeve 52, such as by welding or other suitable means.

The post 49 is generally cylindrically shaped and is dimensioned to be slidably insertable through a longitudinal cavity 52a of the implement sleeve 52, as is shown in FIGS. 3 and 5. The post 49 has a plurality of throughbores 49a for cooperative alignment with a throughbore 52b in the implement sleeve 52. An elevation pin 52c is provided for maintaining alignment of the bearing plate sleeve bore 52b with a selected one of the post bores 49a and thereby maintain a desired elevational spacing of the post 49 relative to the implement sleeve 52. The spacing of the post 49 relative to the implement sleeve 52 is selected such that when the bearing plate 51 operably bears against the lower surface of the frame platform 29, the implement 7 will appropriately extend downwardly from the extended frame 3 to provide the desired tillage of the underlying soil during operation.

A stabilizing mechanism 54, such as a post sleeve 55 and an upper or stabilizing plate 57, cooperates with the post 49, the implement sleeve 52, and the platform 29 to support and stabilize the orientation of the post 49 relative to the frame platform 29. The stabilizing plate 57 is generally circularly shaped, as is shown in FIG. 2. The diameter of the stabilizing plate 57 is dimensioned smaller than the spacing between the frame sleeves 31 of the mounting mechanism 5, such that the frame sleeves 31 do not interfere with the rotation of the stabilizing plate 57, as is hereinafter described. The stabilizing plate 57 is rigidly and perpendicularly secured to the lower extremity of the post sleeve 55, as is shown in FIG. 5. The inner diameter of the post sleeve 55 is dimensioned such that the post sleeve 55 and the stabilizing plate 57 secured thereto can be slidably telescoped over the distal end of the implement sleeve 52.

The relative spacing of the mounting mechanism 5, the implement 7, and the stabilizing mechanism 54 is maintained by securement means, such as a keyway 59 in conjunction with a key 60. The keyway 59 has an axially extending rectangular bore or opening 61 therethrough and is rigidly secured to the post sleeve 55. The implement sleeve 52 has a notch 63, such that as the bearing plate 51 bears against the lower side of the frame platform 29 and the stabilizing plate 57 bears against the upper surface of the frame platform 29, the notch 63 cooperatively provides an opening having the same configuration and dimensions as the opening 61 through the outer extremities of the keyway 59.

The key 60 is configured and dimensioned such that the key 60 is slidably insertable through the keyway opening 61 when the notch 63 is aligned therewith. The keyway 59 has a throughbore 67. Similarly, the key 60 has a throughbore 69 which cooperatively aligns with the bore 67 when the key 60 is inserted in the keyway 59 such that a keeper, such as a pin and clip 71, as shown in FIG. 5, can be inserted through the bores 67 and 69 to rigidly secure the key 60 in the keyway 59.

The stabilizing plate 57 has a plurality of throughbores 73 arranged in a circular configuration which is concentric with the center of the stabilizing plate 57, as is shown in FIG. 2. When the key 60 has been inserted through the keyway 59 and the notch 63, as hereinbefore described, a corresponding set of throughbores 75 in the bearing plate 51, align with the bores 73 in the stabilizing plate 57. An orientation or angular adjustment pin 77 has a head 79 dimensioned substantially larger than the diameter of the bores 73 and a shaft 81 having a diameter dimensioned smaller than the diameter of the bores 73 and 75, such that the shaft 81 is slidably insertable therethrough.

The frame platform 29 has at least one platform throughbore 83 having a diameter dimensioned substantially similar to the diameter of the bores 73 and 75 and spaced from the center of the bore 53 such that when the post sleeve 55 is secured to the implement sleeve 52 by the key 60 as shown in FIG. 3, the bore 83 can be selectively aligned with a corresponding pair of the bores 73 and 75. It is intended that the removal of a single pin, namely the pin 77, permits readjustment of the angular orientation of the implement 7 relative to the mounting mechanism 5, such as that indicated by the arrows referenced by the numeral 85 in FIG. 1, and the reinsertion of a single pin, namely pin 77, re-establishes a new fixed angular orientation of the implement 7 relative to the mounting mechanism 5.

The bearing plate 51 has a turned down edge or flange 87, as is shown in FIG. 3, to provide added structural strength.

Optional end caps 89 are secured to the distal ends of the branch members 15 to prevent accumulation of debris within the branch members 15.

The spacing between the bores 73 is sufficiently small that a multitude of angular orientations of the implement 7 are obtainable; however, the spacing between the bores 73 must be sufficient to avoid compromising the structural integrity of the bearing plate 51 and the stabilizing plate 57.

A first modified embodiment of a combination tillage apparatus in accordance with the present invention is generally designated by the numeral 100, as shown in FIGS. 6 and 7. Many of the characteristics of the first modified embodiment are substantially similar to those already described and will not be reiterated here.

A frame 101 has at least one implement 102 having post 103 rigidly perpendicularly secured to a bearing plate 104. The post 103 is dimensioned such that it is slidably insertable through a substantially centrally spaced aperture or throughbore 105 in a frame plate or platform 107. The spacing of the bearing plate 104 relative to the post 103 is such that when the bearing plate 104 operably bears against the lower surface of the frame platform 107, the implement 102 will appropriately extend downwardly from the frame 101 to provide the desired tillage of the underlying soil during operation.

A stabilizing mechanism 108 comprises a stabilizing plate 109 and a cylindrically shaped post sleeve 111 wherein the stabilizing plate 109 is rigidly secured to one end of the cylindrically shaped post sleeve 111. The inside diameter of the post sleeve 111 is dimensioned such that the stabilizing mechanism 108 can be slidably telescoped over the distal end of the post 103.

An angular adjustment pin 113 provides the ability to adjust the angular orientation of the stabilizing plate 109 relative to the frame platform 107, in the manner hereinbefore described and as indicated in FIG. 6 by the arrow referenced by the numeral 115. Similarly, a frame pin 117 provides the ability to adjust the translational displacement of a mounting mechanism 118 along a pair of parallel branch members 119a.

The post sleeve 111 has at least one diametric throughbore 119 as shown in FIG. 7. The post 103 has a plurality of diametric throughbores 121 such that when the bearing plate 104 abuts the frame platform 107 and the stabilizing plate 109 also abuts the frame platform 107, as is shown in FIG. 7, a different one of the throughbores 121 aligns with the throughbore 119, depending on the angular orientation of the post 103 relative to the post sleeve 111.

A post pin 123, as is shown in FIG. 7, rigidly secures the angular orientation of the post 103 relative to the post sleeve 111. The relative spacing between the throughbore 119 and the throughbores 121 is such that, when the bore 119 is aligned with a selected one of the bores 121, the bores 125 in the stabilizing plate 109 align with the bores 127 in the bearing plate 104. Thus, the angular orientation of the post 103 relative to the frame platform 107 can be different from the angular orientation of the stabilizing plate 109 relative to the frame platform 107.

A second modified embodiment of a combination tillage apparatus in accordance with the present invention, as shown in FIGS. 8 through 12, is generally designated by the numeral 150. Many of the characteristics of the second modified embodiment are substantially similar to those already described in the previous embodiments and will not be reiterated here.

The second modified tillage apparatus 150 generally comprises frame means, such as illustrated compact frame 152, at least one mounting mechanism 154, and at least one interchangeable implement 156, such as a tiller 158 as shown in FIG. 9. The compact frame 152 generally comprises a pair of trunk members, such as illustrated trunk members 160, and a pair of branch members, such as illustrated branch members 162, as shown in FIG. 8. The trunk members 160 are generally operably oriented substantially with the direction of travel of the tillage apparatus 150 when pulled by a tractor 164. The forward end of each of the trunk members 160 is pivotally connected to a front swivel hitch 166 which, in turn, is connected to the tractor 164 in a manner commonly known by those skilled in the art. It is foreseen that virtually any of the many known tractor hitches could be adapted to be used with the present invention.

Each of the trunk members 160 is preferably tubular in configuration such that an extension arm 170 having dimensions smaller than the tubular opening of the trunk member 160 such that the extension arm 170 is slidably insertable therein. Each of the extension arms 170 has a distal end pivotally connected to a rear cross bar 172 and swivel hitch 174, said rear swivel hitch 174 adapted to connect to one of the front swivel hitches 166, as is shown in FIG. 9.

Each of the trunk members 160 has a throughbore (not shown) containing an extension pin 176, such as a bolt or other suitable connector. Each of the extension arms 170 has a plurality of throughbores which are spaced such that a selected one thereof can be aligned with the bore containing the pin 176 such that the spacing of the extension arms 170 and the cross bar 172 can be adjusted relative to the respective trunk members 160 while the pins 176 have been removed.

The pair of branch members 162 are oriented substantially perpendicularly and transversely to the direction of travel of the apparatus 150, and are rigidly secured to the trunk members 160, such as by welding or other suitable means. The pair of branch members 162 are parallelly spaced apart in order to cooperate with the mounting mechanism 154, as is hereinafter described.

In the illustrated embodiment, the length of the branch members 162 is limited such that only two of the mounting mechanisms 154 can be mounted on each pair of the branch members 162—one on each side of the trunk members 160—yet providing sufficient space for each one of the mounting mechanisms 154 to be laterally adjusted relative to the branch members 162; however, it is foreseen that longer branch members could be utilized and modified to receive more than a single mounting mechanism on each lateral side of the trunk member 160 along a pair of the branch members 162. The length of the branch members 162 of the compact frame 152 of the present embodiment is limited such that the compact frame 152 with the implements 156 mounted thereon can be safely used with a garden tractor The length of the trunk members 160 is similarly limited so that only one pair of the branch members 162 can be secured thereto The mounting mechanism 154 comprises a pair of frame platforms 182 and 184 parallelly spaced apart and rigidly secured to a pair of frame sleeves 186 at opposing sides of the platforms 182 and 184 such that the lower surfaces of the frame platform 182 and the frame sleeves 186 are substantially coplanar and the upper surfaces of the frame platform 184 and the frame sleeves 186 are substantially coplanar, as is shown in FIG. 10. Each of the frame sleeves 186 has an axial opening 188 therethrough dimensioned greater than the outside dimensions of the branch members 162, as is shown in FIG. 10, such that the mounting mechanism 154 can be slidably positioned along the branch members 162.

At least one of the frame sleeves 186, such as frame sleeve 190, has a substantially vertically oriented pinhole or bore 192 therethrough. Similarly, the branch member 194, inserted through the opening 188 in the frame sleeve 190, has a plurality of bores 196 spaced therealong for cooperative alignment with the frame sleeve bore 192. A frame pin 198, having a head 200 and a shaft 202, is dimensioned such that the head 200 is substantially larger than the frame sleeve bore 196 and the diameter of the shaft 202 is smaller than the diameter of the bores 192 and 196, such that the shaft 202 is easily slidably insertable through the bores 192 and 196 as the bore 192 is aligned with one of the bores 196. It is intended that the removal of a single pin, namely the frame pin 198, will permit translational repositioning of the mounting mechanism 154 along the pair of branch members 162 and the mounting mechanism 154 then rigidly resecured to the branch members 162 by reinsertion of the frame pin 198 through the bore 192 and a selected one of the bores 196.

The implement 156 comprises a post 204 and a bearing plate 206. Each of the implements 156 has one of the posts 204 rigidly secured thereto such that the post 204 is oriented substantially vertically when the implement 156 is in use. The post 204 is generally cylindrically shaped and is dimensioned to be slidably insertable through a pair of cooperatively aligned apertures or bores 208 centrally located in the frame platforms 182 and 184. The bearing plate 206 is rigidly secured perpendicularly to the post 204, such as by welding or other suitable means.

A stabilizing mechanism 209, such as a post sleeve 210 and a stabilizing plate 212, is generally circularly shaped, as is shown in FIG. 8, and is rigidly perpendicularly secured to one end of the post sleeve 210, as is shown in FIG. 10. The inner diameter of the post sleeve 210 is dimensioned such that the post sleeve 210 with the stabilizing plate 212 secured thereto can be slidably telescoped over the distal end of the post 204 protruding upwardly through the bores 208. The distal end of the post 204 protruding through the post sleeve 210, as the bearing plate 206 is in abutting engagement with the lower surface of frame platform 182 and the stabilizing plate 212 is in abutting engagement with the upper surface of the frame platform 184, is threaded such that a hub 214 can be threadedly advanced thereon, securing the stabilizing mechanism 209 to the mounting mechanism 154.

A bracket 216, positioned atop the hub 214 for mounting a hydraulically powered motor 217, has an upper plate 218 and a lower plate 220. The lower plate 220 is rigidly perpendicularly secured to the outer surface of the post sleeve 210 and the upper plate 218 is rigidly secured to the hydraulically driven motor 217, as is shown in FIG. 10.

A drive shaft 224 is aligned substantially concentrically with the tubular opening in the post 204 such that the drive shaft 224 is rotatable therein. The lower end of the post 204 is rigidly secured to a housing 226, which contains a gearing arrangement commonly known by those skilled in the art for converting rotational motion about the vertically oriented drive shaft 204 to a horizontally oriented rotational motion for driving the tiller 158. A plurality of bolts 228 are inserted through cooperative throughbores 230 in the bracket upper plate 218 and the bracket lower plate 220, such that a motor adapter 232 is forced into positive mechanical engagement with an upper end of the drive shaft 224. The motor 217 has a pair of quick disconnects 234 such that a circuit of pressurized hydraulic fluid can be supplied to the motor 217 for driving the tiller 158, as is shown in FIG. 9.

One end of a cylindrically shaped cowling 236 is rigidly secured to the peripheral edge of the stabilizing plate 212, such as by welding, as is shown in FIG. 10. A yoke 238, comprising a pair of sidebars 240 and at least one crossbar 242 is detachably secured to the cowling 236, such as by a plurality of bolts with nuts 244, as is shown in FIG. 8. The rearwardly extending ends of the sidebars 240 are rigidly secured to a strut sleeve 246, such as by welding as is shown in FIG. 9, with the strut sleeve 246 having an axial opening 247 therethrough.

A strut 248 is configured and dimensioned such that it is slidably insertable through the opening 247 in the strut sleeve 246. The strut 248 has a plurality of throughbores 250 for cooperative alignment with a throughbore 252 in the strut sleeve 246. A strut pin 254 is provided for maintaining alignment of the strut sleeve throughbore 252 with a selected one of the strut bores 250. Preferably, the strut 248 has a hollow structure and a closed lower end 256, as is shown in FIG. 11.

A strut support plate 258 has a pair of opposing axle stubs 260 for rotatably mounting a pair of wheels 262 thereon. The support plate 258 is rotatably mounted in an abutting relationship with the strut lower end 256 and held by a swivel pin 264 inserted through cooperative bores through the support plate 258 and the strut lower end 256, as is shown in FIG. 11. The swivel pin 264 is rigidly secured by passing a swivel pin keeper 266 through cooperating bores in the strut 248 and the swivel pin 264, as is shown in FIG. 11.

The stabilizing plate 212 has a plurality of throughbores 268 arranged in a circular configuration which is concentric with the center of the stabilizing plate 212. The frame platform 184 has at least one throughbore 270 having a diameter dimensioned substantially similar to the diameter of the bores 268 and spaced from the center of the platform bore 208 such that the bore 270 aligns with a selected one of the throughbores 268. An angular adjustment pin 272 is slidably insertable through the bore 270 and a selected one of the bores 268 to maintain such alignment therebetween.

One end of a limiting arm 274 is rigidly secured to the bearing plate 206, as is shown in FIG. 9. A limiting pin 276 is rigidly secured to the distal end of the limiting arm 274 and extends upwardly therefrom, as is shown in FIG. 10. The limiting pin 276 is spaced relative to the mounting mechanism 154 such that the longitudinal axis of the yoke 238 is prevented from angularly deviating from the fore-and-aft axis of the mounting mechanism 154 by an angle greater than approximately 75 degrees. Such limitation is accomplished by the limiting pin 276 making physical contact with the mounting mechanism 154 when such angular deviation occurs.

In an actual application of the second modification of the present invention, the implement 156 is installed as hereinbefore described. The disconnects 234 are secured to a source of hydraulic power to drive the motor 217. The strut 248 is adjusted relative to the strut sleeve 246 and the strut pin 254 is inserted through the bore 252 and a selected one of the bores 250 to provide the necessary support by the wheels 262 such that the desired depth of tilling by the implement 156 is obtained.

If it is desired that the implement 156 maintain a fixed angular orientation relative to the frame 152, the alignment pin 272 is inserted through a selected one of the stabilizing plate bores 268 and the frame platform bore 270 which cooperatively provide the desired angular orientation. If it is desired to modify such angular orientation of the implement 156 relative to the mounting mechanism 154, then one must simply remove the pin 272, reorient the implement 156 relative to the mounting mechanism 154 such that the bore 270 is aligned with another selected one of the bores 268 which provides the desired reorientation, and reinserting the pin 272.

If it is desired that the implement 156 maintain an orientation relative to the direction of travel, then the pin 272 is not used. In that event, the limiting pin 276 prevents the yoke 238 and the wheels 262 from assuming an undesirably large angular deviation from that obtained during normal operation, such as might occur during sharp turns or backing of the tractor 164.

If it is desired to modify the spacing of the mounting mechanism 154 relative to the frame 152, then it is a simple matter to remove the frame pin 200, shift the mounting mechanism 154 along the branch members 162, such that the frame sleeve bore 192 aligns with another selected one of the bores 196 which provides the desired displacement, and reinsert the frame pin 198.

If it is desired that additional tilling operations be conducted during a single pass, then additional ones of the frames 152 can be connected in tandem in a third modified embodiment of the invention, such as is shown in FIG. 13. If more than one of the implements require hydraulic power, T-type connectors and cross connectors can be utilized in the hydraulic lines, as is shown in FIG. 13. Note that the spacing between a pair of the branch member 162 is such that the mounting mechanism 154 and the mounting mechanism 5 from the previous embodiments can be used interchangeably. When the implement, such as a disk, performs its tilling operation by utilizing its weight in combination with the weight of the frame on which the implement is installed, then further support may not be required to be provided by the yoke 238 and the wheels 262 and such can be eliminated.

It is to be understood that while certain forms of the present invention have been illustrated and described herein, it is not to be limited to the specific forms or arrangement of parts described and shown.

What is claimed and desired to be secured by Letters Patent is as follows:

1. A combination soil tilling apparatus for connecting to and towing behind a tractor and for tilling underlying soil, comprising:
   (a) at least one mounting mechanism having a pair of parallel and spaced apart frame sleeves rigidly secured together by an interconnecting platform; at least one of said pair of frame sleeves having a substantially vertically oriented pinhole; said platform having a generally centrally spaced aperture and an angular adjustment platform throughbore;
   (b) a frame having a trunk member positioned along the direction of travel of said apparatus; said frame further having a pair of branch members rigidly secured substantially perpendicularly to said trunk member; each one of said pair of branch members aligned parallel to one another and spaced apart such that said pair of branch members are slidably receivable in and through said pair of frame sleeves; said branch members having a plurality of frame throughbores spaced for selective alignment with said pinhole;
   (c) a frame pin for transitional adjustment of said mounting mechanism relative to said frame; said frame pin adapted to be slidably insertable through said pinhole and a selected one of said plurality of frame throughbores;
   (d) at least one implement for tilling the soil; said implement having attachment means including a post for operably attaching said implement to said mounting mechanism;

(e) a stabilizing mechanism for stabilizing said post relative to said mounting mechanism; said stabilizing mechanism including a stabilizing plate and a post sleeve dimensioned to slidably telescope over the distal end of said post; said stabilizing plate rigidly perpendicularly secured to an end of said post sleeve such that said stabilizing plate operably abuts said platform; said stabilizing plate having a plurality of angular adjustment throughbores spaced for selective alignment with said platform throughbore;

(f) an angular adjustment pin for angular adjustment of said stabilizing mechanism relative to said platform; said angular adjustment pin adapted to be slidably insertable through a selected one of said plurality of angular adjustment throughbores and said platform throughbore;

(g) securement means for operably securing the relative spacing of said mounting mechanism, said implement, and said stabilizing mechanism; and (h) support means for generally maintaining the spacing of said implement relative to the underlying soil.

2. A combination soil tilling apparatus according to claim 1 wherein:

(a) said attachment means includes said post dimensioned to be slidably insertable through said aperture; and (b) said implement having a bearing plate perpendicularly rigidly secured to said post for operably abutting said platform.

3. A combination soil tilling apparatus according to claim 1 wherein:

(a) said attachment means includes an implement sleeve having a bearing plate perpendicularly rigidly secured to an end thereof and a sleeve throughbore; said implement sleeve dimensioned to be slidably insertable through said aperture such that said bearing plate operably abuts said platform; and (b) said post dimensioned to be slidably insertable in and through said implement sleeve; said post having a plurality of post throughbores spaced for selective alignment with said sleeve throughbore for elevational adjustment of said implement relative to said frame.

4. The combination soil tilling apparatus according to claim 3 wherein said securement means includes:

(a) a keyway rigidly secured to an outer surface of said post sleeve;

(b) a notch in said implement sleeve for cooperative alignment with said keyway; said notch spaced such that said bearing plate and said stabilizing plate are secured in substantially abutting relationship with said platform as said notch is cooperatively aligned with said keyway;

(c) a key for slidable insertion through said keyway and said cooperatively aligned notch such that said implement sleeve is substantially rigidly secured to said stabilizing mechanism when said key is positioned in said keyway and such that adjustment of the angular orientation of said stabilizing mechanism relative to said mounting mechanism simultaneously adjusts the angular orientation of said implement sleeve relative to said mounting mechanism; and (d) a keeper for removably securing said key in said keyway.

5. The combination soil tilling apparatus according to claim 2 wherein said securement means includes:

(a) said post sleeve having at least one diametrical transverse post sleeve throughbore;

(b) said post having a plurality of diametrical transverse post throughbores for selective alignment with said post sleeve throughbore; said post throughbores spaced such that said bearing plate and said stabilizing plate are secured in substantially abutting relationship with said platform and as said post sleeve throughbore is in cooperative alignment with a selected one of said post throughbores; and (c) a post pin for slidable insertion through said post sleeve throughbore and a cooperatively aligned selected one of said post throughbores such that said post is substantially rigidly secured to said stabilizing mechanism and such that adjustment of the angular orientation of said implement relative to said stabilizing mechanism is substantially separately adjustable from the adjustment of the angular orientation of said stabilizing mechanism relative to said mounting mechanism.

6. The combination soil tilling apparatus according to claim 2 wherein:

(a) said securement means includes:
1) said post having a threaded distal end; and
2) a hub threadably mounted on said post such that said bearing plate and said stabilizing plate are secured in substantially abutting relationship with said platform; and including (b) a drive shaft spaced internally to and substantially concentrically with said post; said drive shaft adapted to transfer power to said implement by rotational motion thereof;

(c) a hydraulically powered motor having an adapter for mounting said motor;

(d) a lower bracket rigidly secured to said post sleeve; and (e) an upper bracket rigidly secured to said motor; said upper bracket adapted for rigid securement to said lower bracket such that said motor adapter is forced into positive mechanical engagement with said drive shaft such that said motor operably transfers rotational movement to said drive shaft for transfer to said implement.

7. The combination soil tilling apparatus according to claim 2 wherein:

(a) said apparatus having;
1) a first configuration wherein said angular adjustment pin is inserted through a selected one of said plurality of said angular adjustment throughbores and said platform throughbore such that the angular orientation of said implement is fixed relative to said frame; and
2) a second configuration wherein said angular adjustment pin is removed such that the angular orientation of said implement is relative to the direction of travel of the apparatus; and includes (b) a shroud rigidly secured to said stabilizing plate;

(c) a yoke detachably rigidly secured to said shroud;

(d) a strut sleeve rigidly secured to the distal end of said yoke;

(e) a strut dimensioned to be received within and through said strut sleeve; said strut selectively adjustably secured relative to said strut sleeve;

(f) at least one wheel rotatably mounted near the lower end of said strut; said mounted wheel rotatable about both a horizontal axis and a substantially vertical axis; and (g) a limiting arm rigidly secured to said bearing plate; said limiting arm having a substantially vertically extending limiting pin near the distal end thereof such that said limiting pin prevents substantial angular displacement of said yoke relative to said mounting mechanism.

8. The combination soil tilling apparatus according to claim 1, including:

(a) an extension arm dimensioned and adapted to be fixedly and adjustably secured to the rearwardly extending end of said trunk member; said extension arm having a swivel rotatably secured to the distal end thereof for connecting another one of said soil tilling apparatus thereto in tandem.

9. A tillage apparatus adapted for towing behind a tractor and for tilling underlying soil, comprising:

(a) frame means having at least one cooperating pair of parallelly spaced branch members oriented substantially transversely to the direction of travel of the tractor; said pair of branch members rigidly secured to at least one trunk member oriented substantially along the direction of travel of the tractor; said pair of branch members extending substantially outwardly from said trunk member;

(b) support means for maintaining said pair of branch members substantially parallel with the underlying said during operation of the apparatus; said support means includes a yoke in combination with a wheel and a wheel strut which provide a first configuration and a second configuration wherein said first configuration provides a fixed angular orientation of said implement relative to said frame means and said second configuration provides an angular orientation of said implement relative to the direction of travel of the apparatus;

(c) mounting means for securement to said pair of branch members; said mounting means being selectively translationally adjustable relative to said pair of branch members;

(d) stabilizing means for securement to said mounting means; said stabilizing means being selectively angularly adjustable relative to said mounting means; and (e) a tilling implement for tilling the underlying soil; said implement mounted on said branch members by said mounting means and said stabilizing means.

* * * * *